United States Patent
Piekarz

(10) Patent No.: US 7,672,701 B2
(45) Date of Patent: Mar. 2, 2010

(54) TELEPHONE HANDS-FREE SYSTEM FOR A MOBILE TELEPHONE

(75) Inventor: Roman Piekarz, Mielec (PL)

(73) Assignee: Bury Sp.z.o.o., Mielec (PL)

( * ) Notice: Subject to any disclaimer, the term of this patent is extended or adjusted under 35 U.S.C. 154(b) by 544 days.

(21) Appl. No.: 11/366,825

(22) Filed: Mar. 3, 2006

(65) Prior Publication Data

US 2006/0239444 A1   Oct. 26, 2006

(30) Foreign Application Priority Data

Mar. 9, 2005   (DE) .................. 10 2005 011 620
May 3, 2005   (DE) .................. 10 2005 020 981

(51) Int. Cl.
*H04M 1/00* (2006.01)
(52) U.S. Cl. .................. 455/575.9; 379/420.04; 379/455
(58) Field of Classification Search ............ 379/420.04, 379/455; 455/575.9
See application file for complete search history.

(56) References Cited

U.S. PATENT DOCUMENTS

| | | | | |
|---|---|---|---|---|
| 5,659,594 A | * | 8/1997 | Toda | 455/550.1 |
| 5,659,887 A | * | 8/1997 | Ooe | 455/575.9 |
| 6,028,930 A | * | 2/2000 | Chen | 379/446 |
| 6,226,497 B1 | * | 5/2001 | Guntzer et al. | 455/66.1 |
| 2002/0155860 A1 | * | 10/2002 | Tordera et al. | 455/557 |
| 2002/0190176 A1 | * | 12/2002 | Louh | 248/316.4 |
| 2004/0087335 A1 | | 5/2004 | Peiker | |
| 2004/0097274 A1 | * | 5/2004 | Schlegel | 455/569.2 |

* cited by examiner

*Primary Examiner*—Vincent P Harper
*Assistant Examiner*—Marivelisse Santiago-Cordero
(74) *Attorney, Agent, or Firm*—Whitham Curtis Christofferson & Cook, PC

(57) ABSTRACT

A telephone hands-free system for a mobile telephone, having a holder (1) which has electronics, for holding a mobile telephone which is designed for wire-free communication, and having a control arrangement for controlling at least one hands-free function for the mobile telephone can be designed with a universal holder (1) for different mobile telephones in that the control arrangement is accommodated in the holder, in that the holder is designed for wire-free communication with the mobile telephone, and in that the holder can be adjusted for mechanically holding mobile telephones of different size.

10 Claims, 5 Drawing Sheets

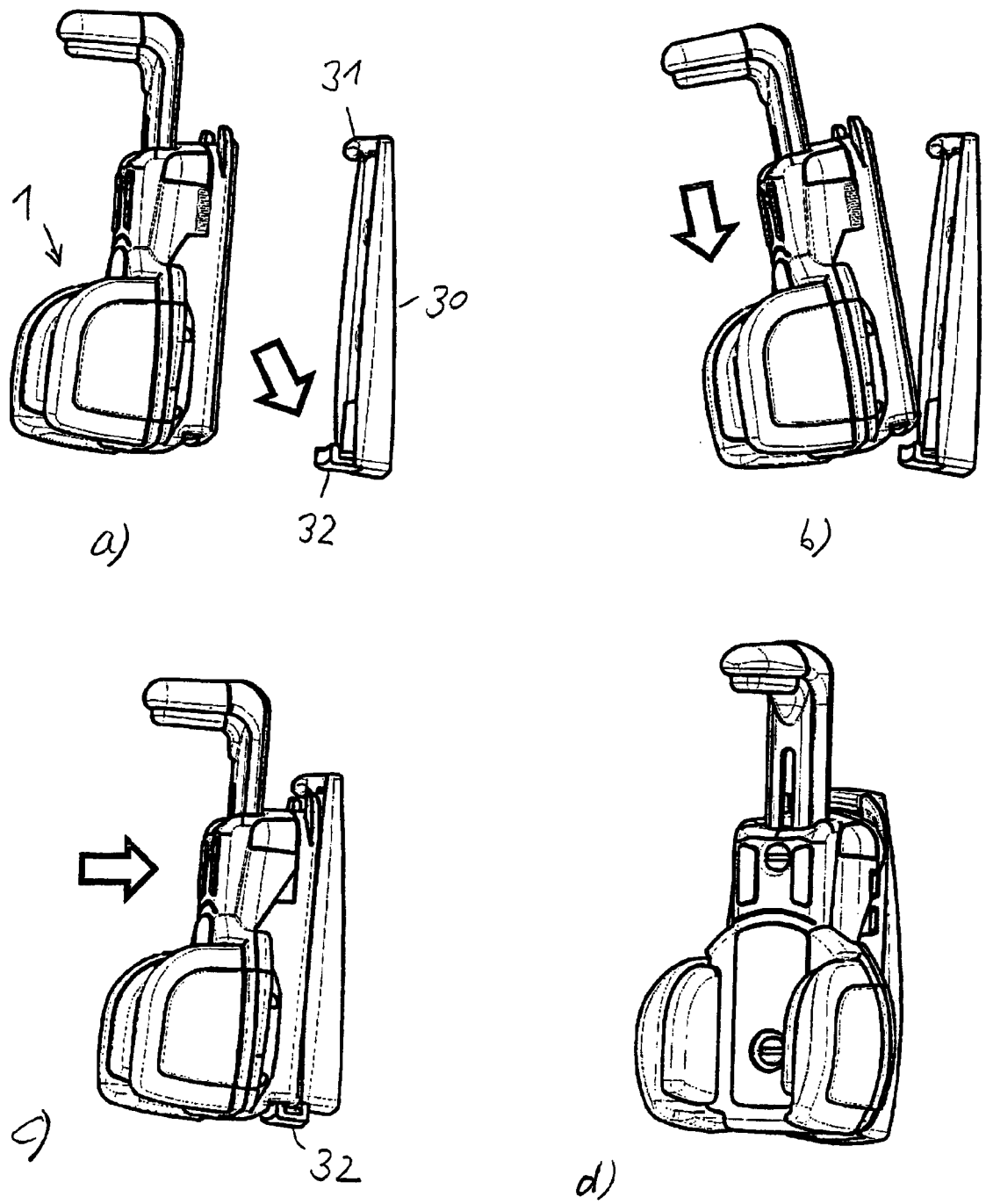

TELEPHONE HANDS-FREE SYSTEM FOR A MOBILE TELEPHONE

The invention relates to a telephone hands-free system for a mobile telephone, having a holder which has electronics, for holding a mobile telephone which is designed for wire-free communication, and having a control arrangement for controlling at least one hands-free function for the mobile telephone.

Known systems of this type have a holder which is designed specifically for the respective mobile telephone and is thus able not only to mechanically correctly hold the mobile telephone but also to make appropriate electrical contact in accordance with the specific contact arrangement.

Particularly for motor vehicles, it is known for a control arrangement which is arranged in a control box and can be permanently installed in the motor vehicle to interact with a holder such as this. The connection between the respective holder and the control box may in this case have a standardized design, so that different holders for different mobile telephones can be connected to a permanently installed control box. This means that only the associated holder need be replaced when a mobile telephone is changed, while the permanently installed control box can remain in the vehicle and is suitable for connection of another holder, which is designed for a new mobile telephone.

Relatively modern mobile telephones are designed for wire-free communication with other electronic appliances, specifically based on the Bluetooth Standard. Suitable holders have also been designed for mobile telephones such as these, and can interact with the control box that is installed in the vehicle.

The known concept is based on the assumption that as much functionality as possible is combined in the control box in order that it can be reused when the mobile telephone is changed. On the other hand, the requirements for the functionality of the holder have increased, so that the holders must also be designed to have increasingly complicated electronics. Since different holders have to be designed for different mobile telephone types, this necessitates a high degree of development and implementation effort in order to provide the required functionalities on the one hand for the various holders and on the other hand for the control box.

The present invention is based on the object of specifying a simplified concept of a telephone hands-free system, as mentioned in the introduction, for a mobile telephone.

According to the invention, in order to achieve this object, a telephone hands-free system of the type mentioned in the introduction is distinguished in that the control arrangement is accommodated in the holder, in that the holder is designed for wire-free communication with the mobile telephone, and in that the holder can be adjusted for mechanically holding mobile telephones of different size.

The present invention is based on a completely different concept, in which the holder has all of the functionality, that is to say it is also suitable for carrying out the control functions for the mobile telephone. On the other hand, however, the holder is not specifically designed for the mobile telephone, since it is mechanically adjustable such that it can securely mechanically hold different mobile telephones. There is no need for electrical contact with the mobile telephone, because the holder—in the same way as the mobile telephone as well—has a device for wire-free communication, preferably based on the Bluetooth Standard, so that the required control data from the mobile telephone or for the mobile telephone can be transmitted between the mobile telephone and the holder without the use of wires. This also includes those control functions such as a remotely controllable dialing function, for example by means of speech control. An appropriate processor can likewise be accommodated in the holder.

The holder according to the invention is thus a universal holder which is suitable for all mobile telephone types which can communicate without the use of wires.

However, the holder according to the invention is not directly suitable for recharging the rechargeable battery in the mobile telephone when the mobile telephone is being held by the holder. A conventional charging cable must be used for this purpose, as is normally used for charging a mobile telephone, for example from a cigarette lighter connection in the motor vehicle. It is also possible to provide for the holder to be provided with an electrical output, at which electrical power which can be used for charging purposes is thus produced, for example in the case of a cigarette lighter. In this case as well, a specific charging cable must be used for the specific mobile telephone, which can be plugged into the electrical output of the holder and generates the charging parameters (charging voltage, charging current) required by the respective mobile telephone, from the predetermined standard voltage.

The holder according to the invention must be accommodated in the passenger compartment in a motor vehicle. At least one loudspeaker and regularly, at least one microphone are provided for the operation of a hands-free device in a motor vehicle. Furthermore, a connection for an external receiving antenna may be expedient, since the appliance's own antenna of the mobile telephone frequently provides greatly reduced reception, and possibly reception subject to interference, within the metallic vehicle bodywork. In order to avoid the corresponding connecting cables having to be routed to the holder within the passenger compartment, one preferred embodiment of the invention provides for the holder to be connected via a cable to a connecting box with plug connecting devices, by means of which the electronics in the holder can be connected to external appliances, such as a loudspeaker, microphone, antenna etc. The connecting box can be accommodated in a concealed location behind the dashboard or in the center console of the motor vehicle, since it need have only small dimensions and is considerably smaller than a previously normal control box with its own electronics. The connecting box contains no special electronics required for functionality, and is generally provided with passive electrical components, for example for filtering out interference from the supply voltage.

In one preferred embodiment, the holder for the telephone hands-free system is also provided with a speech recognition facility.

This thus allows speech control of a mobile telephone via the speech recognition facility which is installed in the holder, even when the mobile telephone itself does not have a speech recognition facility. The corresponding control signals are generated in the holder, and are transmitted to the mobile telephone without the use of wires. The transmitted control signals may preferably be dialing signals, since the dialing process, particularly in the case of a hands-free system in a car, by means of speech control is the input option for dial digits which distracts the driver to the least extent. For the same reasons, further control signals for the mobile telephone can also be entered by speech control.

The invention will be explained in more detail in the following text with reference to exemplary embodiments which are illustrated in the drawing, in which:

FIG. 5 shows four phases for the insertion of the housing of the holding apparatus in a holding panel.

Figure 1:
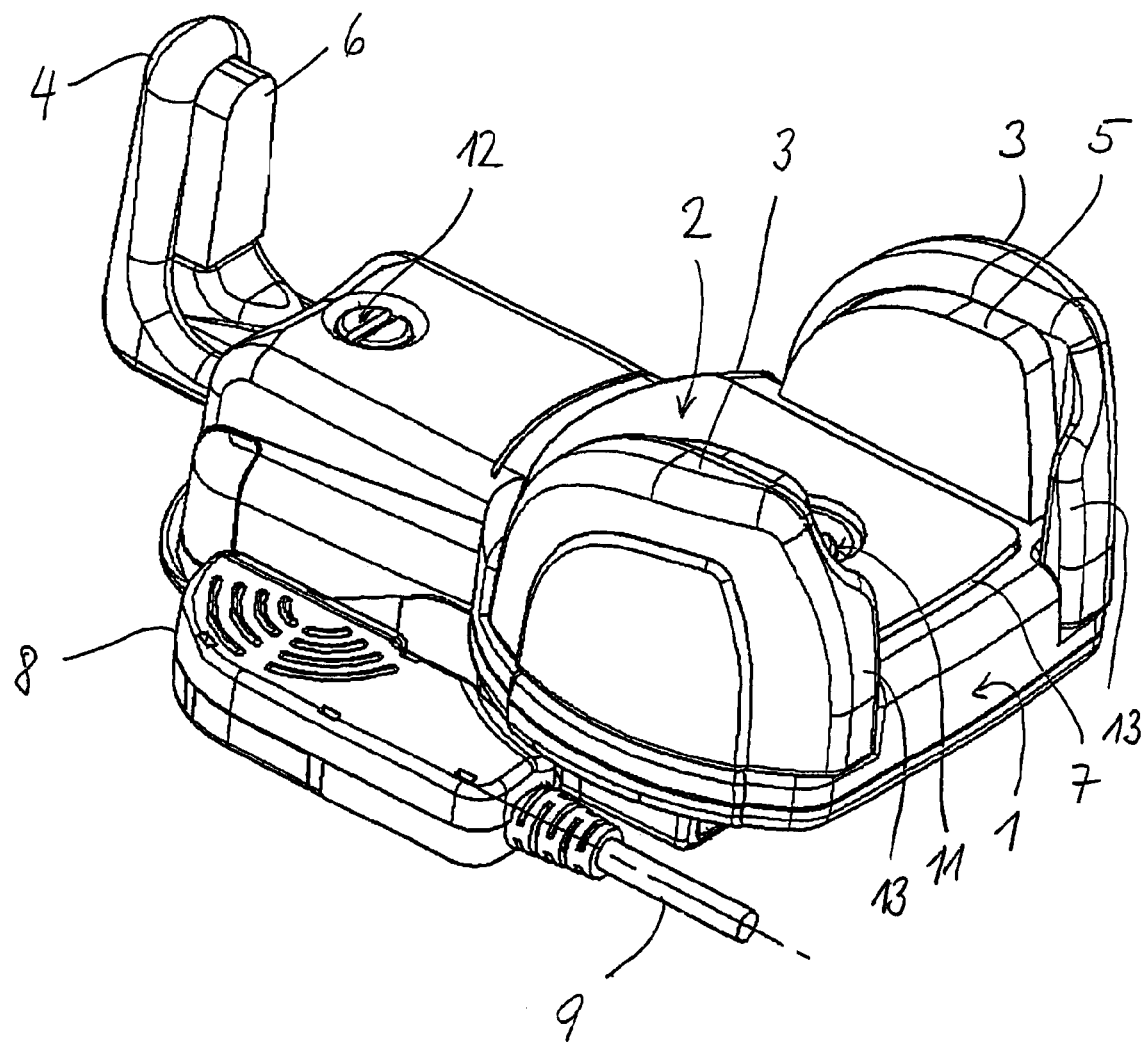
FIG. 1 shows a perspective illustration of a holding apparatus according to the invention.

As can be seen from FIG. 1, the holding apparatus has a housing 1 which forms a rear wall 2 for a holding device which is formed from two side jaws 3, which project from the rear wall 2, and a vertical jaw 4 which can be moved at right angles to the other jaws. The side jaws 3 are each provided on the faces that point towards one another with a flat cushion 5 composed of a medium-hard elastic plastic. A corresponding cushion 6 is fitted to the vertical jaw 4. The rear wall 2 is provided with a flat cushioned rest 7 between the side jaws 3. The cushions 5, 6 in this case have a thickness of 3 to 7 mm, preferably 5 mm, and the cushion rest has a thickness of 1 to 4 mm, preferably 2 mm. The housing is designed to be closed underneath the rear wall 2, and is equipped on one longitudinal face with a connection for a cable plug 8 of a charging cable 9.

As can also be seen from FIG. 1, an adjusting device 11 is provided between the side jaws 3 on the rear wall 2 and, furthermore, an adjusting device 12 is likewise provided in the rear wall 2, in the vicinity of the vertical jaw 4.

At their end facing away from the vertical jaw 4, the side jaws 3 have a folded-over attachment 13, which together form an opposing bearing for the vertical jaw 4 and a rest for a mobile telephone which has been inserted vertically into the holding apparatus.

Figure 2:
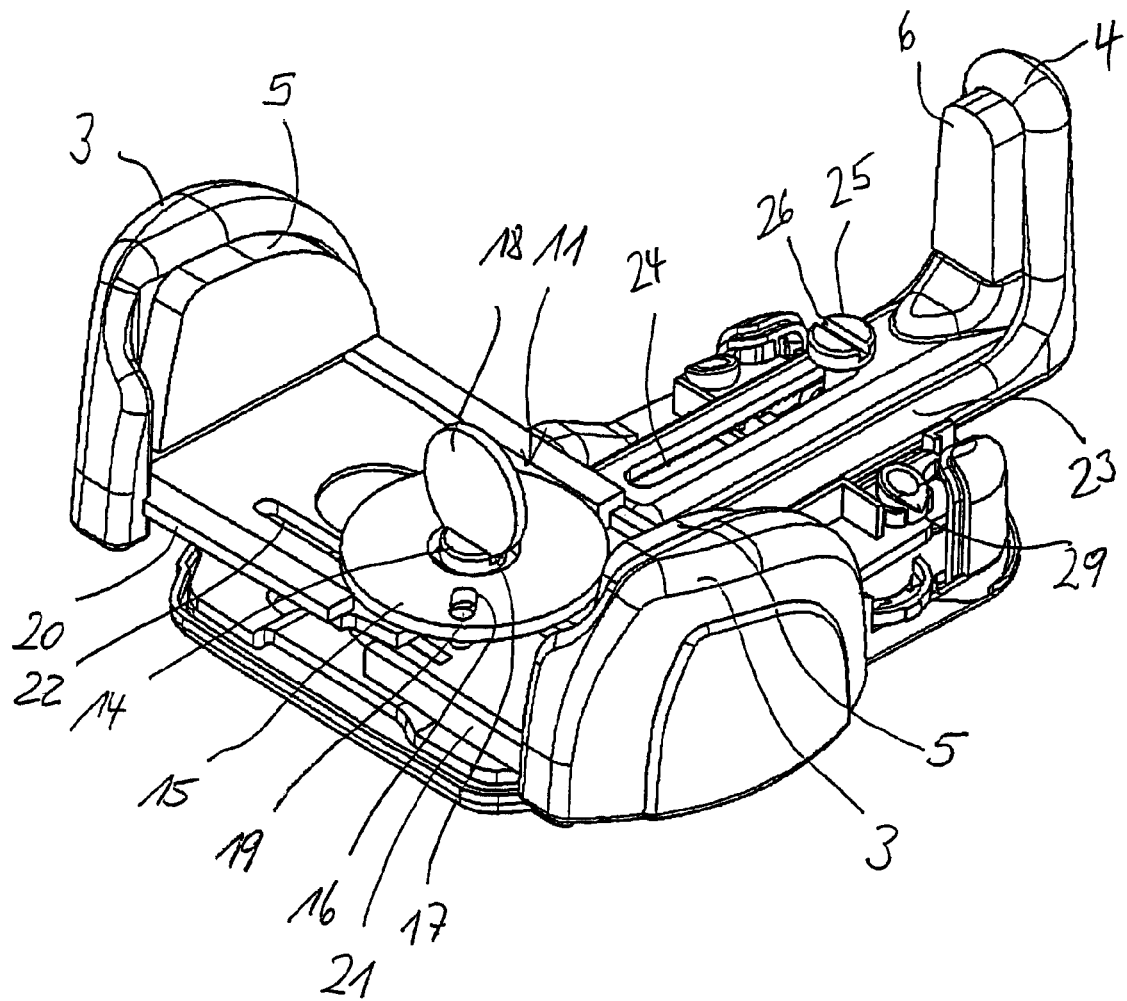
FIG. 2 shows a perspective illustration of the holding apparatus shown in FIG. 1, without any covering panels, in order to explain adjustment mechanisms.

FIG. 2 shows the adjustment mechanisms for the side jaws 3 on the one hand and for the vertical jaw 4 on the other hand, since the holding apparatus is illustrated with covering panels removed.

The adjusting device 11 for the side jaws 3 has a round panel 15 on which two radially aligned elongated holes 16 are located diametrically opposite one another. A screw head 14 of a screw which projects through the panel 15 is provided with a longitudinal slot 17, into which a coin 18 can be inserted in order to fix the panel 15 in its position by rotation of the screw head 14. A pin 19 projects into each of the elongated holes 16.

The side jaws 3 are each connected, preferably integrally, to panels 20, 21 which run underneath and parallel to the panel 15, and whose length is greater than half the maximum distance between the side jaws 3, so that the panels 20, 21 overlap in the center of the holding apparatus even when the distance between the side jaws 3 is at its maximum, that is to say they are guided over one another. The two panels are each fitted with one of the pins 19 which project into the elongated holes 16. The upper panel 20 is provided with a longitudinal slot 22, which is open towards the free end and through which the pin 19 on the lower panel can project as far as the elongated hole 16 when the side jaws are moved towards one another.

In the position illustrated in FIG. 2, the side jaws 3 are at the greatest possible distance from one another. By movement of the side jaws 3 towards one another, the pins 19 which are arranged diametrically opposite the center point of the panel 15 are moved linearly as a result of appropriate guidance of the panels 20, 21, and in the process rotate the panel 15, when the screw head 14 is released. Once the distance between the side jaws 3 has been set to a distance which is suitable for a specific mobile telephone, the position of the panel 15 is fixed by means of the coin 18 and the screw head 14. It is then no longer possible to move the side jaws 3, unless the screw head 14 is released again.

The vertical jaw 4 has a rear-face longitudinal attachment 23, which is provided with a longitudinal slot 24. A screw projects through the longitudinal slot 24 and has a screw head 25 whose diameter is larger than the width of the longitudinal slot 24. The screw head 25 is provided with an operating slot 26, which is likewise suitable for the insertion of a coin 18.

Figure 3:
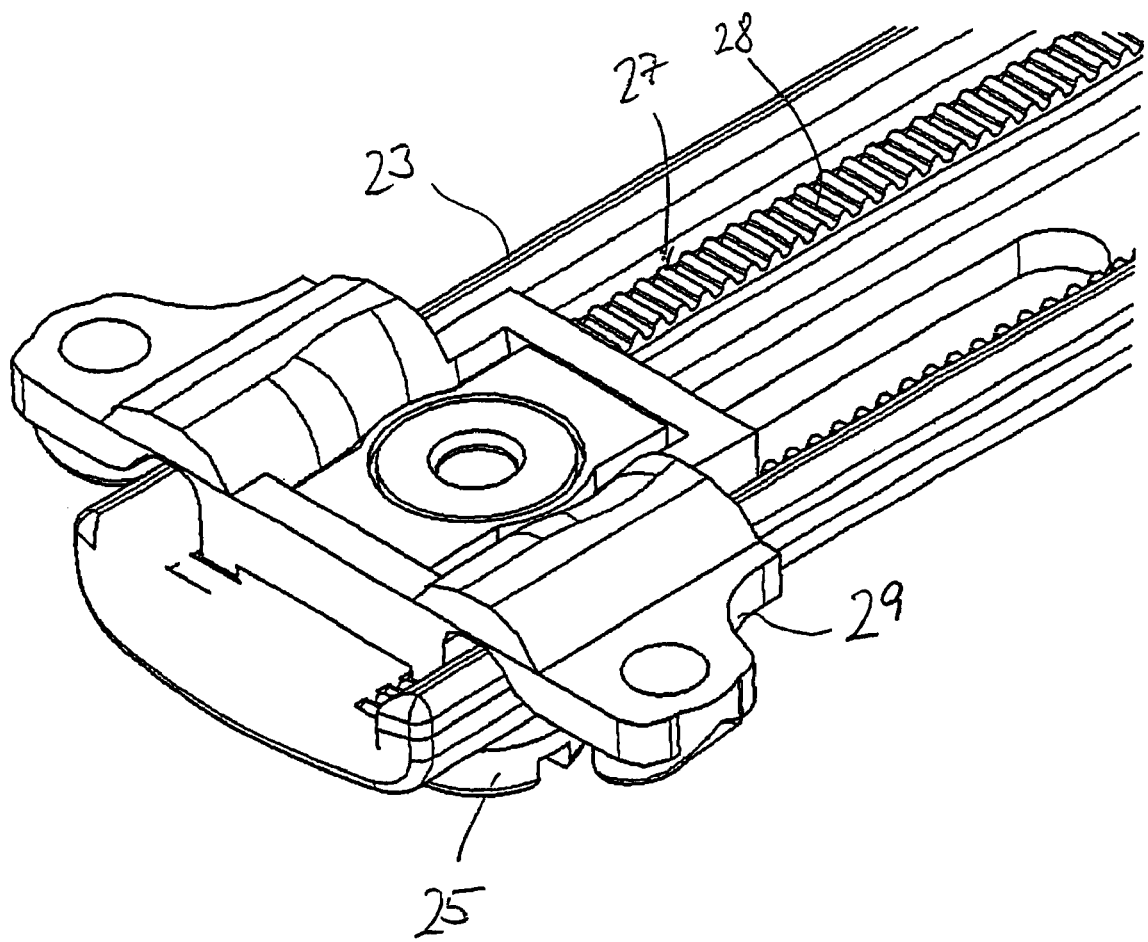
FIG. 3 shows a perspective illustration of a detail of an adjustment device.

FIG. 3 shows a perspective view of the underneath of the elongated attachment 23 and shows that it is provided on its lower face with two rails 27, on which a tooth system 28 is located, with teeth aligned transversely with respect to the longitudinal axis. A slide 29 is guided underneath the attachment 23 by the screw head 25 via a threaded bolt (which is not illustrated) and has a tooth system (which is not illustrated) which corresponds to the tooth system 28 on its surface that projects upwards. Releasing the screw head 25 creates an intermediate space between the tooth system 28 and the tooth system on the slide 29, so that the attachment 23 can be moved in the longitudinal direction relative to the slide 29, which is arranged in a fixed position. Tightening the screw which is connected to the screw head 25 results in the slide 29 being drawn against the tooth system 28 on the attachment 23, so that the two tooth systems engage in one another thus fixing the vertical jaw 4 in a defined position.

Figure 4:
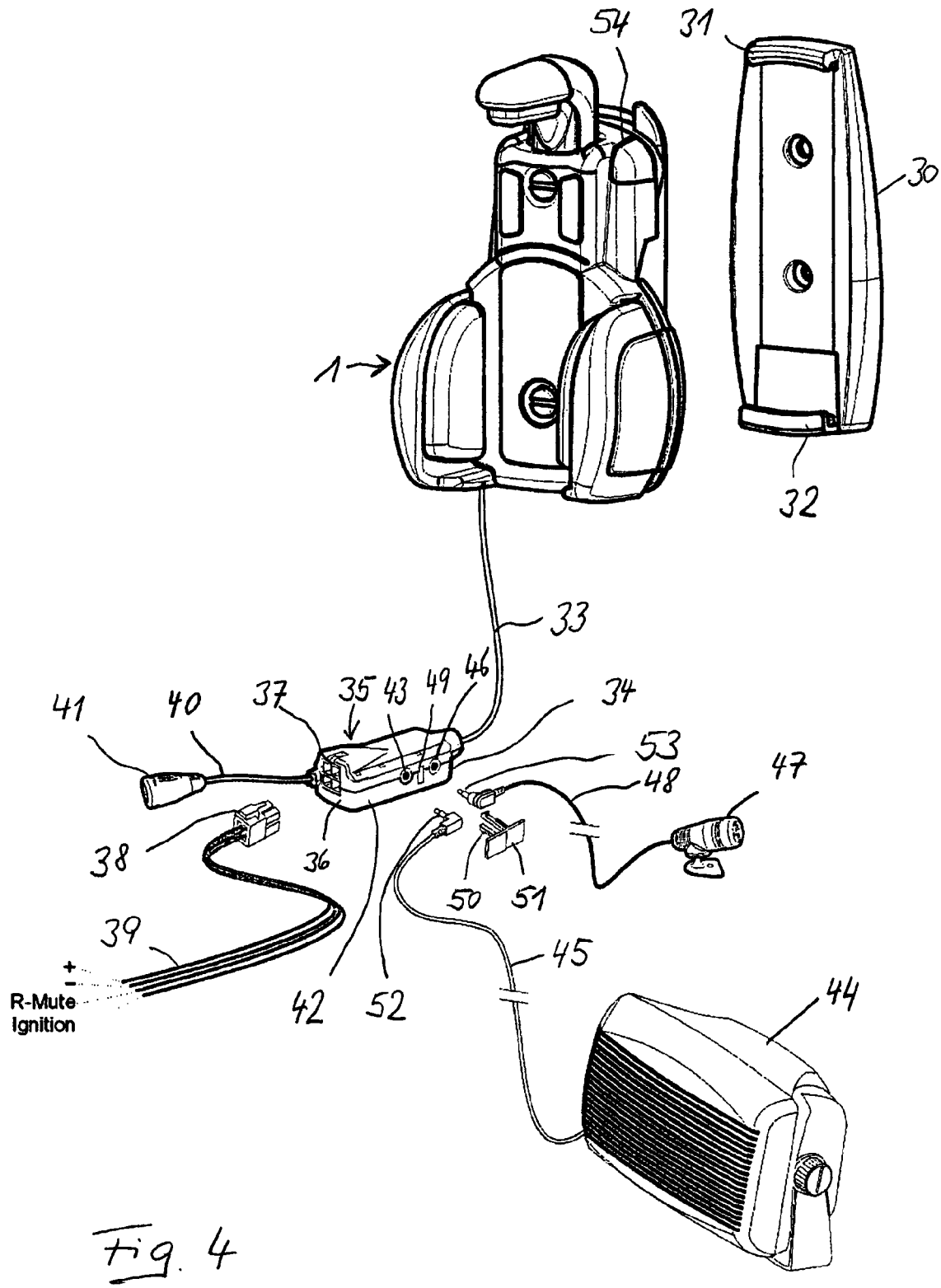
FIG. 4 shows another perspective illustration of the holding apparatus according to the invention, with a connection for a connecting box.

As can be seen from FIG. 4, the housing 1 of the holder can be mechanically attached to a holding panel 30, which has an upper attachment 31 in the form of a claw and a lower attachment 32 in the form of a claw, which clasp corresponding edges on the rear face of the housing 1. The lower claw arrangement 32 on the holding panel 30 is in this case designed such that it can be moved downwards and, after clasping the housing 1, can be locked such that the housing 1 of the holder is held securely on the holding panel 30, which is attached to the dashboard or to a center console.

A connecting cable 33 is passed out of the housing 1 of the holder at the lower end and towards the rear face, and is inserted into a first end wall 34 of a housing of a connecting box 35. In addition to the first small end wall 34, this connecting box 35 has an opposite second small end wall 36, in which a plug socket 37 is arranged, which is intended for connection to a corresponding plug 38 on a control and supply cable 39. A short antenna cable piece 40 is passed out of the housing 35 at the side edge of the second end wall 36, and opens into an antenna socket 41. The control and supply cable 39 contains two conductors (+, −), for supplying a supply voltage (the battery voltage of the motor vehicle), and two conductors for transmission of a signal which characterizes the ignition being switched on (standardized terminal 15 of the motor vehicle electronics) and for transmission of a signal for muting the car radio (R mute).

The housing of the connecting box 35 has an essentially rectangular cross section and is provided with four casing walls 42, which are designed to be considerably larger than the end walls 34, 36. The housing of the connecting box 35 has an elongated housing, in a corresponding manner, with relatively small end walls 34, 36.

A plug socket 43 for a loudspeaker cable 45 which is connected to a loudspeaker 44 is arranged on one of the casing walls 42. A plug socket 46 for a microphone cable 48, which is connected to a microphone 47, is positioned adjacent in the longitudinal direction of the housing of the connecting box 35. A latching receptacle 49 is located between the two plug sockets 43, 46, into which two latching limbs 50 of a cover 51 can be snapped, so that the two sockets 43, 46 can be closed by the cover 51 when it is not intended to connect a loudspeaker 44 and/or a microphone 47. It is also possible to design the cover such that it covers the inserted plugs of the loudspeaker cable and of the microphone cable, and thus secures them.

The loudspeaker cable 45 and the microphone cable 48 are, of course, provided with corresponding conventional plugs 52, 53, which can be inserted into the plug sockets 43 and 46, respectively in order to make contact.

The telephone hands-free system according to the invention thus allocates the connection options for the loudspeaker 44, the microphone 47 and, possibly, an antenna (via the antenna plug 41) to the connecting box 35 without contact having to be made on the visible face of the dashboard, when arranged in a motor vehicle. In fact contact is made—even for the control and supply cable 39—at the universal connecting box 35, which is arranged outside the housing 1 of the holder, with a single connecting cable 33, behind the dashboard or behind the cladding on a center console.

Furthermore, an area which is covered with a transparent covering cap 54 can be seen on the housing 1 in FIG. 4, behind which two light-emitting diodes (which are not illustrated) are located, by means of which the respective functional status of the holder can be indicated. The area which is covered by the cap 54 can also at the same time be in the form of a key, which can be operated when, for example, a telephone call is intended to be accepted, or a call is intended to be ended. A further possibility is to initiate the initial dialog between the holder and the inserted mobile telephone, in order to ensure Bluetooth communication, by pushing a button (on this keyboard or some other button).

The housing 1 can also be provided with further control buttons in order to provide further functions, such as a voice-dial function, in which the dialing process is carried out by speaking dial digits, or by speaking a name from a telephone book.

FIG. 5 shows that the housing 1 is attached to the holding panel 30 by, according to step b) a lower rearward end of the housing 1 being pushed obliquely against the attachment 32 which is in the form of a claw, so that the latter is moved downwards. According to step c) sufficient space is then available for the upper rearward end of the housing 1 to be pushed against the rear wall of the holding panel 30 and for the housing 1 now to be moved upwards with the lower attachment 32, which is in the form of a claw, so that the upper rearward end of the housing 1 moves under the upper attachment 31 which is in the form of a claw. Since the lower attachment 32 which is in the form of a claw is locked in the position in which it is being pushed upwards, the housing 1 is now firmly attached to the holding panel 30 (step d))

The invention claimed is:

1. A telephone hands-free system for a mobile telephone in a motor vehicle, comprising:

a holder arranged in a passenger compartment of the motor vehicle for holding a mobile telephone including electronic circuitry capable of communicating with the mobile telephone;

a control arrangement for controlling the mobile telephone including at least one hands-free function, wherein said control arrangement is accommodated in the holder, wherein the holder is designed for wire-free communication with the mobile telephone for transmitting control data from the control arrangement to the mobile telephone, wherein the holder is not specifically designed for the mobile telephone and is adjusted for mechanically holding mobile telephones of different sizes, and the holder is connected though a cable to a connection box arranged in a concealed location of the motor vehicle remote from the holder and having connecting devices by means of which the electronics in the holder are connected to at least one external appliance which is installed in the motor vehicle, the external appliance being selected from the group consisting of a loudspeaker, a microphone, and an antenna.

2. The telephone hands-free system as claimed in claim 1, wherein the connecting devices are provided at least for a loudspeaker cable which leads to a loudspeaker, and for a microphone cable which leads to a microphone.

3. The telephone hands-free system as claimed in claim 2, further comprising a plug connecting device for a control and supply cable.

4. The telephone hands-free system as claimed in claim 1, wherein the holder comprises an electrical output for providing electrical power for charging.

5. The telephone hands-free system as claimed in claim 4, further comprising a device for controlling charging arranged in a charging cable specific for the mobile telephone, said device being connectable at one end to the electrical output and at another end to the mobile telephone.

6. The telephone hands-free system as claimed in claim 1, wherein the holder has at least one light-emitting diode for indicating a respective function of the holder.

7. The telephone hands-free system as claimed in claim 1, wherein the holder has at least one operating device for operating at least one function of the mobile telephone.

8. The telephone hands-free system as claimed in claim 1, wherein the holder is provided with a speech recognition facility.

9. The telephone hands-free system as claimed in claim 8, wherein the speech recognition facility is designed for conversion from speech signals to dialing signals.

10. The telephone hands-free system as claimed in claim 8, wherein the speech recognition facility is designed for conversion of speech signals to control signals for functions of the mobile telephone that has been inserted into the holder.

* * * * *